(No Model.) 2 Sheets—Sheet 1.

E. A. SPERRY.
COMMUTATOR AND BRUSH FOR ELECTRIC MOTORS AND GENERATORS.

No. 297,867. Patented Apr. 29, 1884.

ATTEST:
Robt Burns
L. A. Marceron

INVENTOR:
E. A. Sperry
per J. K. Nottingham
Attorneys.

(No Model.) 2 Sheets—Sheet 2.

E. A. SPERRY.
COMMUTATOR AND BRUSH FOR ELECTRIC MOTORS AND GENERATORS.

No. 297,867. Patented Apr. 29, 1884.

UNITED STATES PATENT OFFICE.

ELMER A. SPERRY, OF CHICAGO, ILLINOIS.

COMMUTATOR AND BRUSH FOR ELECTRIC MOTORS AND GENERATORS.

SPECIFICATION forming part of Letters Patent No. 297,867, dated April 29, 1884.

Application filed June 9, 1883. (No model.)

*To all whom it may concern:*

Be it known that I, ELMER A. SPERRY, a citizen of the United States, residing at Chicago, in the county of Cook and State of Illinois, have invented certain new and useful Improvements in Commutators and Brushes of Electric Motors and Generators, of which the following is a specification, reference being had therein to the accompanying drawings.

This invention relates to automatic means for preventing injury to the brushes of magneto-electric generators and motors by reversal of the direction of rotation of the commutators. The brushes or wipers for taking the current from or communicating it to the commutators are usually delicate in construction, and are inclined toward the commutator, each having one end resting thereupon, and when the commutator turns in a direction corresponding to the inclination of the brushes toward it—that is, when it turns from the end edges of the brushes—these brushes will not be injured by bending, jamming, or doubling up; but if the commutator turns in the opposite direction—that is, toward the edges of the brushes which rest upon it—the brushes are liable to be doubled up, or to have their edges jammed out of shape. In obviating this danger to the brushes, I provide each machine with two pairs of brushes or wipers, those of one pair being inclined toward the commutator in direction opposite to the inclination of the other pair, and I connect these two pairs of brushes with automatic devices, by which they will be respectively brought into and thrown out of contact with the commutator at proper times—that is, each pair will be brought into contact when the commutator rotates in correspondence with their inclination, and the other pair will be at the same time thrown out of contact.

The invention consists of certain novel combinations of devices for effecting the automatic adjustment of the brushes into and out of contact with the commutator, as will be fully understood from the following particular description, in connection with the accompanying drawings, in which—

Figure 1:
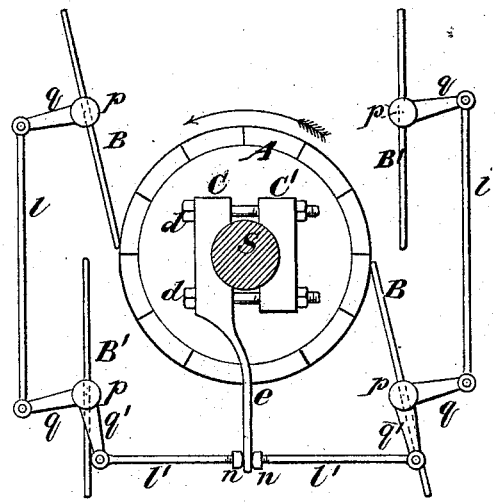
Figure 2:
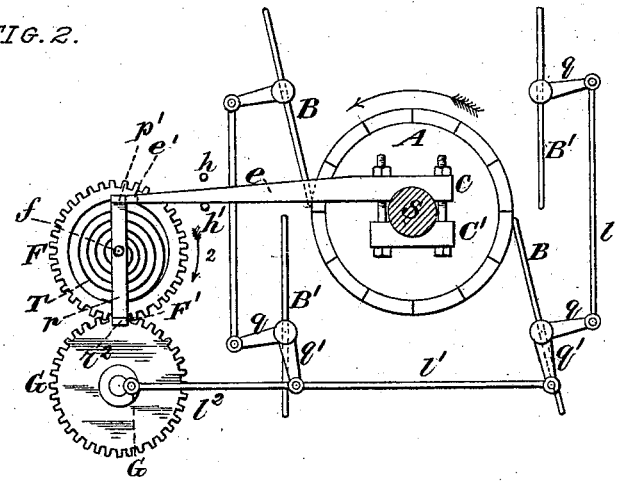
Figure 3:
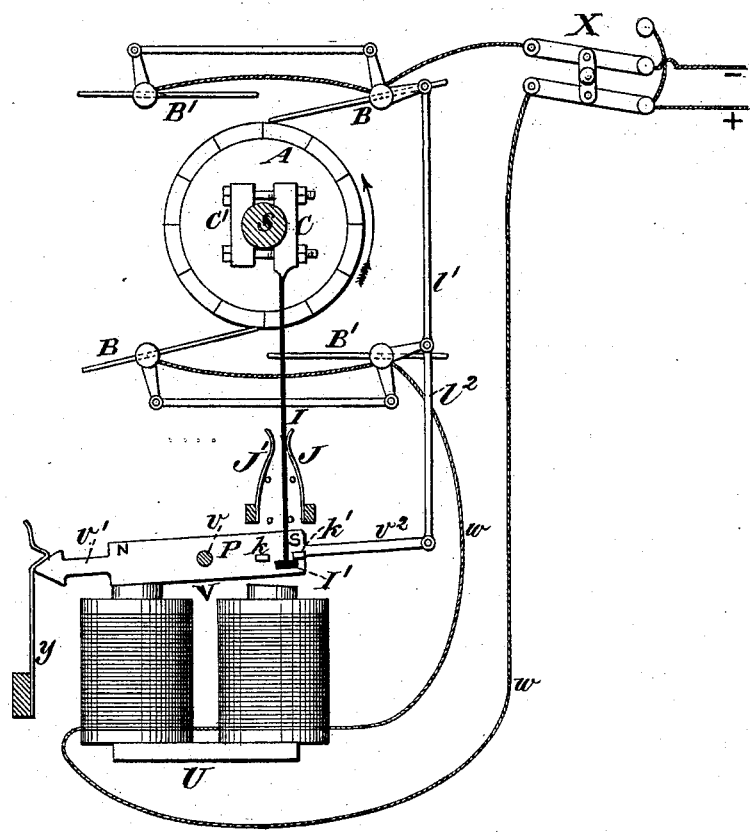

Figure 1 is an end elevation of a commutator and its shaft and two pairs of brushes connected with devices operated directly by the commutator-shaft for controlling their positions. Fig. 2 is a similar view showing the brushes connected with controlling devices operated by shifting mechanism supplementary to the commutator-shaft. Fig. 3 is a similar view showing the brushes connected with devices controlled partly by the direction of rotation of the commutator-shaft and partly by the direction of the current.

Referring to Fig. 1, the letter A indicates the commutator, and B B and B' B' the two pairs of brushes. These brushes are mounted in the usual manner in rotary studs or pins $p$, and these pins have projecting from them arms $q$, the pairs of which on opposite sides of the commutator are connected by links $l$. The lower pins, $p$, have also projecting arms $q'$, which are connected by a link, $l'$.

The commutator-shaft S is embraced by two clamping-pieces, C and C', which are held against its opposite sides with a slight frictional pressure by means of adjusting-bolts $d$. The clamping-piece C has an extension-arm, $e$, which is slotted to embrace the link $l'$ at about its middle, said link being provided with adjustable nuts $n$ on opposite sides of said arm, by which its position may be regulated. The clamping-pieces C and C' embrace the shaft S with sufficient frictional pressure to cause them to be turned by the shaft until some opposition to their turning is met, and then the shaft will rotate between the said clamping-pieces. It will now be seen that when the commutator rotates in the direction of the arrow the tendency of the arm $e$ will be to move in a similar direction, and consequently the link $l'$ will be moved to carry the arms $q'$ to the position shown in the drawings, thus moving the pins $p$ to throw the brushes B into contact with the commutator and the brushes B' out of contact therewith. Now, should the direction of the commutator be changed, the position of the arm $l$ will be correspondingly changed, and the link $l'$ moved to shift the pins $p$ through the intermediate links, so that the brushes B will be thrown out of contact and the brushes B' will be thrown into contact with the commutator; and it will be further seen that in whichever direction the commutator may rotate the pair of brushes which is brought into contact with it will incline toward it in a direction corresponding with its rotation, so that the brushes will not be jammed endwise or in danger of being doubled up.

In Fig. 2 the link $l'$ is connected at one end with a pitman, $l^2$, which is connected to a crank-pin on a toothed wheel, G, which forms a portion of a clock-work train and gears with a similar wheel, F, mounted on a shaft, $f$, which is impelled in the direction of the arrow No. 2 by means of a spring, T, which may be wound up by suitable means. (Not shown.) The shaft $f$ carries a cross-arm, $r$, which projects unequal distances on opposite sides of the shaft, for a purpose which will presently appear. At one end this arm carries an outwardly-projecting lug, $r'$, and at the other end a similar lug, $r^2$. The arm $e$ of the clamping-piece C extends between two stops, $h$ and $h'$, which limit its motion in either direction. Said arm $e$ at its end carries a pin, $e'$, (indicated in dotted lines,) which projects toward the wheel F. When said arm $e$ is by the rotation of the commutator-shaft carried against the lower stop, $h'$, the pin $e'$ will stand in position to be struck by the lug $r'$ of the arm $r$, and will thus form a stop to prevent further rotation of the shaft $f$, and in this position the crank-pin of the wheel G and pitman $l^2$ will hold the link $l'$ in such position that, through the intermediate arms, $q'$ and $q$, and the links $l$, the brushes B will be brought into contact and the brushes B' will be thrown out of contact with the commutator. Now, if the direction of the commutator should be reversed, the arm $e$ would be thrown against its upper stop, $h$, and its pin $e'$ would be carried outward from the path of the lug $r'$, thus releasing said lug, so that the shaft $f$ would be freed, and would make a half-rotation, thus bringing the opposite lug, $r^2$, in contact with the pin $e'$, when the shaft would be again stopped, the rotation of the wheel F, which is fixed to said shaft, at the same time turning the wheel G, so that its crank-pin is moved to a position diametrically opposite to that in which it is shown in the drawings, thus causing the pitman $l^2$ to shift the link $l'$ and its intermediate connections with the brushes, so that the brushes B will be thrown out of contact and the brushes B' will be thrown into contact with the commutator, for the purpose heretofore set forth. The modification shown in this Fig. 2 possesses the advantage that a very sudden and prompt change of the brushes takes place when the direction of the commutator changes, and the brushes are also held to a good contact with the commutator. It will be seen that in this modification the arm $e$ acts only as a trip to throw into action and arrest at proper times the power which shifts the brushes.

In Fig. 3 the shifting of the brushes depends upon the combined movement of the commutator-shaft and the direction of the current supplied to a motor. In this modification the clamping-piece C is provided with an arm, I, having at its lower end a cross-head, I'. This arm I is held in a central or true vertical position by springs J and J', which are of sufficient tension to compel said arm to stand in its normal or true vertical position when the commutator-shaft is at rest—no matter in which direction it may have been rotating.

The letter V indicates a permanent magnet, which is pivoted at $v$ in front of the poles of an electro-magnet, U, the helices of which have one terminal connected with the lower brushes B and B' by means of wire $w$, and the other terminal connected with one terminal of a pole-charger, X, which has its other terminal connected with the upper brushes B and B'. The magnet V has a pointed extension, $v'$, which is held in either of its extreme positions by means of a spring, $y$, and its other end is provided with an extension, $v^2$, which is connected with the pitman $l^2$, which performs the same function here that it does in Fig. 2. The permanent magnet V is provided with projecting pins $k$ and $k'$, separated by such space as to allow the cross-head I' to pass freely between them when the arm I is in its central position, but said cross-head will engage with one or the other of said pins, either above or below it, when the arm I is thrown out of its vertical position. The operation of this modification is as follows: When the commutator is turning in the direction indicated by the arrow, the cross-head I engages under the pin $k'$ of the magnet V, supposing said magnet to have been tilted by the current supplied to the position as shown in the drawings, so that the pitman $l^2$, the link $l'$, and its intermediate connections are operated to throw the brushes B B in contact with the commutator. Now, should the current be reversed by moving the pole-charger, the polarity of the cores of the electro-magnet U would be reversed and tend to tilt the magnet V to a position the reverse of that shown in the drawings, and at this time the commutator-shaft would be powerfully retarded by the reverse current; but the proper time for the reversal of the brushes would not be at the exact time of the reversal of the current, but would be at the time of the reversal of the motion of the commutator, which would be effected at the instant the shaft stopped its rotation, because then the springs J and J', as before stated, would bring the arm I to its central or true vertical position, so that it would release the pin $k'$ and allow that end of the permanent magnet to be attracted downward. It will also be understood that even though the shaft should stop and the arm I be shifted to its vertical position, the brushes would be still held as before were the current not reversed. It will now be seen that in this modification the act of reversing the current brings to bear upon the brush-shifting devices a force which will shift them promptly at the proper time, but cannot act until the instant the commutator ceases to move in the direction from which its motion is to be reversed.

Having now fully described my invention,

I wish it to be understood that I do not limit myself to any particular construction of devices for attaining the desired object, but may vary these devices in any manner for the more efficient carrying out of the invention without departing from the essential principle thereof.

What I claim is—

1. The combination, with the commutator of a magneto-electric generator or motor, of two pairs of brushes, and mechanism for automatically bringing said pairs of brushes alternately in contact with said commutator in accordance with its direction of rotation, substantially as described.

2. The combination, with the commutator and two pairs of brushes, substantially as described, of automatic devices controlled by the rotation of the commutator-shaft for shifting one pair of brushes out of and the other pair into contact with said commutator, when its direction of rotation is reversed.

In testimony whereof I affix my signature in presence of two witnesses.

ELMER A. SPERRY.

Witnesses:
LOREN GREENE,
ALLEN A. GRIFFITH.